(12) United States Patent
Mendelson et al.

(10) Patent No.: US 12,468,890 B1
(45) Date of Patent: Nov. 11, 2025

(54) LARGE LANGUAGE MODEL ENSEMBLE FOR COMBINATORIAL RETRIEVAL IN ONE-TO-MANY MATCHING TASKS

(71) Applicant: Intuit Inc., Mountain View, CA (US)

(72) Inventors: Shon Mendelson, Petah Tikva (IL); Sigalit Bechler, Petah Tikva (IL); Natalie Bar Eliyahu, Petah Tikva (IL); Hadas Baumer, Petah Tikva (IL); Linoy Cohen, Petah Tikva (IL); Tom Klein, Petah Tikva (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/266,602

(22) Filed: Jul. 11, 2025

(51) Int. Cl.
*G06F 40/284* (2020.01)

(52) U.S. Cl.
CPC .................. *G06F 40/284* (2020.01)

(58) Field of Classification Search
USPC ...................................................... 704/1–504
See application file for complete search history.

(56) References Cited

U.S. PATENT DOCUMENTS

| | | | | |
|---|---|---|---|---|
| 11,080,336 B2* | 8/2021 | Van Dusen | ............ | G06Q 50/01 |
| 11,409,732 B2* | 8/2022 | Carvalho | ............ | G06F 16/2246 |
| 11,775,504 B2* | 10/2023 | Carvalho | ............ | G06F 16/2462 |
| | | | | 707/690 |
| 12,210,839 B1* | 1/2025 | Burton | .................. | G06T 11/206 |
| 2014/0282586 A1* | 9/2014 | Shear | .................... | G06F 16/245 |
| | | | | 718/104 |
| 2021/0224247 A1* | 7/2021 | Carvalho | ............ | G06F 16/2365 |
| 2022/0335035 A1* | 10/2022 | Carvalho | ............ | G06F 16/2462 |
| 2024/0303235 A1* | 9/2024 | Kulkarni | .......... | G06F 16/24522 |
| 2024/0412720 A1* | 12/2024 | Vasylyev | .......... | G06F 16/90332 |

FOREIGN PATENT DOCUMENTS

WO   WO-2025144462 A1 *   7/2025 ............. G06F 9/451

* cited by examiner

*Primary Examiner* — Marcus T Riley
(74) *Attorney, Agent, or Firm* — Lathrop GPM LLP

(57) ABSTRACT

A method of executing a matching language model to perform a many-to-one matching task. The matching task uses a number of tokens that exceeds a token limit of the matching language model. The number of tokens is reduced to a reduced number of tokens by executing a rule-based application on a target entry and a dataset of entries to output a data subset including fewer entries. The reduced number of tokens are reduced within the token limit by executing a sorting language model on the data subset and the target entry to output candidate matching sets. The candidate matching sets are evaluated as to whether a potential match exists with the target entry. The matching language model is executed on the number of candidate matching sets and the target entry to output a selected matching set matching the target entry. The selected matching set is returned.

20 Claims, 5 Drawing Sheets

| ID | Amount | Date | Customer Name |
|---|---|---|---|
| 1 | $100 | 2025/03/01 | John Doe |
| 3 | $100 | 2025/02/28 | John Doe |
| ... | ... | ... | ... |
| X | $50 | 2025/02/28 | John from Bonn |
| ... | ... | ... | ... |
| N | $225 | 2025/02/01 | / |

LARGE LANGUAGE MODEL ENSEMBLE FOR COMBINATORIAL RETRIEVAL IN ONE-TO-MANY MATCHING TASKS

CROSS-REFERENCE TO RELATED APPLICATIONS

This application is related to U.S. application Ser. No. 18/987,876, filed Dec. 19, 2024.

BACKGROUND

Language models, such as large language models (e.g., CHATGPT® by Open AI, LLC) are increasingly used for a variety of computing tasks due to their versatility. Additionally, a language model may be subject to fewer retraining iterations, and thus may be less costly to operate.

However, language models have certain limitations. For example, one significant limitation is that a language model has a constraint on the maximum number of tokens that may be input into a language model. A "token" is a word, phrase, character, or other type of data, such as images or numbers.

While a large language model may have a token constraint between a few thousand tokens to about a million tokens, the limitation still may be a technical problem in some applications. For example, some matching tasks (i.e., matching a first dataset to a second dataset) could involve inputting millions or even billions of tokens to a language model. Furthermore, the most common language models have a token constraint of a few thousand tokens. Advanced language models with higher token constraints may be undesirable, because the computational cost of executing an advanced large language model may be prohibitive, and also because the monetary cost of accessing an advanced large language model may be prohibitive.

A computational task that exceeds a maximum token constraint of a language model (i.e., the language model selected to perform the computational task) may be referred to as a "large" computational task. Thus, by definition, the selected language model is incapable of performing a large computational task, as that computational task is defined with respect to the maximum token constraint.

Thus, a technical problem is presented. The technical problem is how to improve a computer to overcome token constraints of language models applied to large computational matching tasks.

SUMMARY

One or more embodiments provide for a method of executing a matching language model to perform a many-to-one matching task. The method includes reducing a number of tokens to a reduced number of tokens by executing a rule-based application on a target entry and a dataset of entries to output a data subset including fewer entries than the dataset of entries. The data subset and the target entry are selected from the dataset of entries. The many-to-one matching task uses a number of tokens that exceeds a token limit of the matching language model. The method also includes reducing the reduced number of tokens to within the token limit by executing a sorting language model on the data subset and the target entry to output a number of candidate matching sets. The number of candidate matching sets are evaluated as to whether a potential match exists with the target entry. The method also includes executing the matching language model on the number of candidate matching sets and the target entry to output, from among the number of candidate matching sets, a selected matching set matching the target entry. The method also includes returning the selected matching set.

One or more embodiments also provide for a system. The system includes a computer processor and a data repository in communication with the computer processor. The data repository stores a target entry and a token limit. The data repository also stores a dataset of entries which include a data subset including fewer entries than the dataset of entries, a number of candidate matching sets, a number of matching entries, and a selected matching set that matches the target entry. Performing a many-to-one matching task on the target entry and the dataset of entries uses a number of tokens exceeding the token limit. The data repository also stores a reduced number of tokens relative to the number of tokens used to perform the many-to-one matching task, but higher than the token limit. The system also includes a rule-based application executable by the computer processor on the target entry and the dataset of entries to output the data subset corresponding to the reduced number of tokens. The system also includes a sorting language model, having the token limit, executable by the computer processor on the data subset and the target entry to output the plurality of candidate matching sets and to reduce the reduced number of tokens to within the token limit. The system also includes a matching language model executable by the computer processor on the number of candidate matching sets and the target entry to output, from among the number of candidate matching sets, the selected matching set.

One or more embodiments provide for another method. The method includes training a sorting language model executable by a computer processor on a data subset and a target entry to output a number of candidate matching sets that match the target entry and to reduce a reduced number of tokens to within a token limit. The method also includes executing, recursively, steps. The steps include Commanding the sorting language model to identify the number of candidate matching sets from the data subset. The steps also include comparing the number of candidate matching sets to a set of correct matching sets to identify an accuracy of the sorting language model. The steps also include executing, responsive to the accuracy being below a threshold, a reward function that generates a reward for each of the number of candidate matching sets that correctly matches a member of the set of correct matching sets and that further rewards and that further generates the reward according to a coverage of the each of the number of candidate matching sets. The steps also include applying the reward to the sorting language model to update parameters of the sorting language model to generate an updated sorting language model. The method also includes determining whether convergence occurs. Convergence occurs when the accuracy satisfies the threshold. If convergence does not occur, then the steps of executing recursively repeats. The method also includes terminating, responsive to the convergence, recursive execution of the steps. The method also includes returning, as a trained sorting language model after convergence, the updated sorting language model.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

Figure 1:
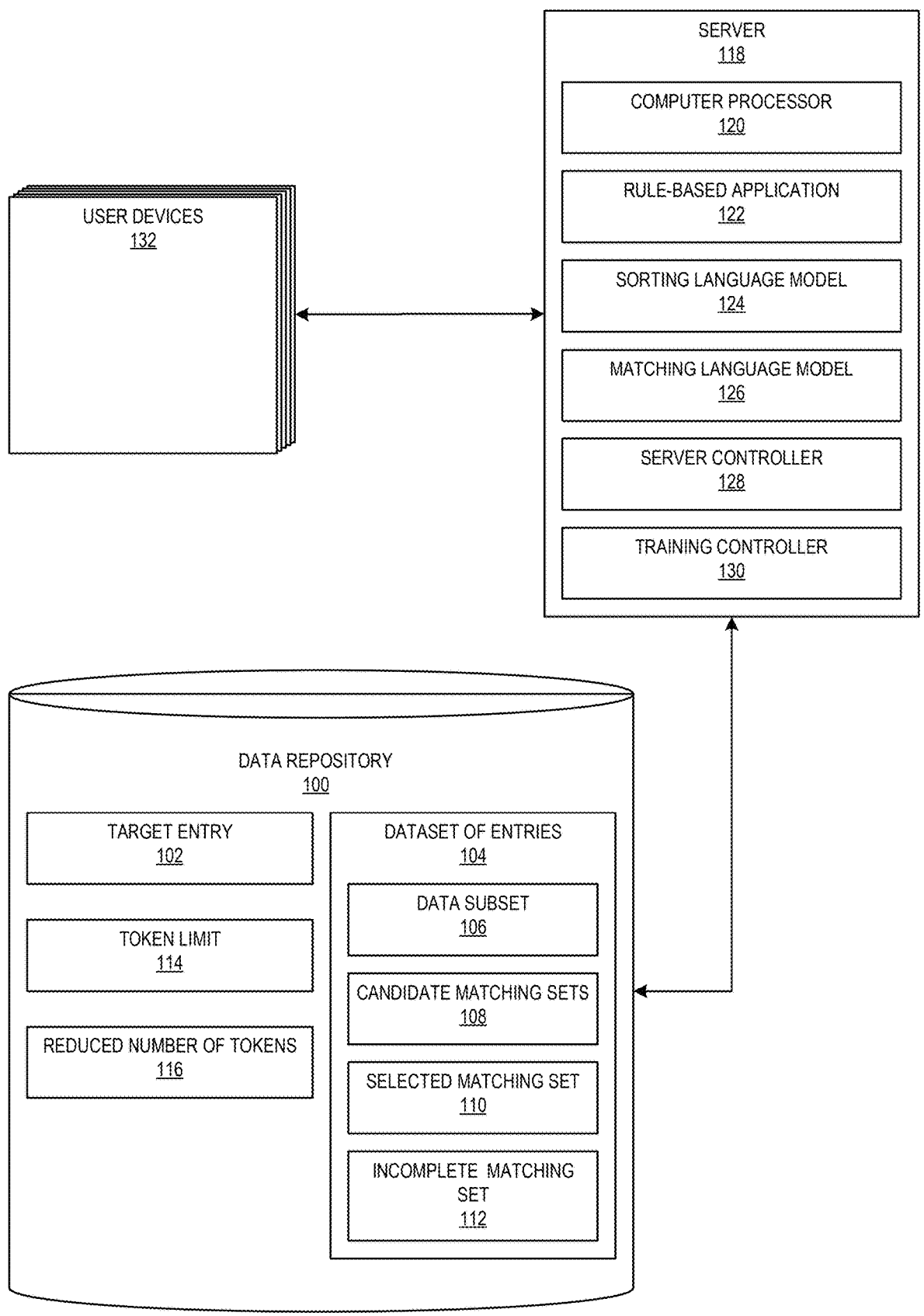
FIG. 1 shows a computing system for a large language model ensemble for combinatorial retrieval in one-to-many matching tasks, in accordance with one or more embodiments.

One or more embodiments are directed to systems and methods for overcoming token constraints of language models when applied to computational matching tasks. One or more embodiments also increase the computational speed of language models by reducing the computational cost of performing a computational matching task.

A matching task may be characterized, generally, as matching at least first entries in a first data set to at least second entries in a second dataset. For example, a bank statement (a first dataset, where each transaction in the bank statement is a "first entry") may be matched to an electronic ledger (a second dataset, where each transaction in the electronic ledger is a "second entry").

One or more embodiments refer to matching a first dataset to a second dataset for the sake of brevity. However, one or more embodiments are applicable to matching multiple datasets to each other and further to match multiple entries in each of the multiple datasets to one or more other datasets in one or more of the multiple datasets.

Matching tasks can represent technical computational difficulties for language models. In particular, language models are subject to token limitations. A token limitation is the maximum number of tokens that a language model can process in a single interaction. A token is a word, a value of a number, etc.

Some matching tasks, particularly many-to-one matching tasks invoking matching multiple data entries in one dataset to a single data entry in a single dataset, can overwhelm a language model's token limitation. Many-to-one matching tasks, for example, generate an exponentially increasing number of tokens processed by the language model. The number of tokens specifically increases exponentially with the number of possible combinations in the first dataset that could match the one entry in the second dataset.

However, one or more embodiments are not limited to many-to-one matching tasks. One or more embodiments also contemplate handling other matching tasks that overwhelm the token limitation of a language model.

Briefly, one or more embodiments reduce the number of tokens by multiple methods. First, a rule-based application may be used to eliminate data entries in the first dataset that fail to comply with rules of the rule-based application. Thus, the rule-based application reduces the number of possible tokens involved in the matching task.

Second, the reduced number of tokens are further reduced using a sorting language model. The sorting language model is commanded to identify candidate matching sets among the first dataset, relative to the second dataset. Because identifying possible matches, or partial matches, involves processing fewer tokens, the sorting language model task does not overwhelm the token limit of the sorting language model (at least after the first rule-based application eliminated some data entries). However, the sorting language model outputs potential candidate matching sets, not an exact matching set.

Nevertheless, the candidate matching sets are provided to a matching language model. Because candidates are easier to evaluate than the entire dataset, the matching language model's token limit is not overwhelmed. Thus, the matching language model is able to predict which dataset, among the candidate datasets, matches the second dataset.

Thus, one or more embodiments overcome the technical problem of matching problems overwhelming the token limit of language models. Additionally, by reducing the number of tokens to be processed, one or more embodiments also increase the computational speed of performing the computational matching task.

One or more embodiments also address additional technical constraints of language models when executing a many-to-one matching problem. In a many-to-one matching task, a single transaction (the second dataset) might correspond to numerous documents (the first dataset) as candidates, making it impractical and inefficient to encapsulate all relevant details within a single prompt to the language model. Consequently, a targeted retrieval process of one or more embodiments helps to sift through and exclude irrelevant documents.

The retrieval process is complex for several reasons. First, the text data in the documents often lacks sufficient detail, rendering standard retrieval algorithms ineffective. Second, the inherently combinatorial nature of many-to-one matching problems means that retrieving candidates individually could result in only partial capture of viable combinations. Thus, pertinent matches may be overlooked.

However, one or more embodiments provide for a language model-based solution that elevates the level of simplicity and agility of the many-to-one matching problem. Furthermore, the reduction of the tokens used in executing the task prevents the number of potential matches from overwhelming the token limit of the language model.

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores a target entry (102) in a computer readable data structure. The target entry (102) is an entry in a second dataset (not shown) that is to be matched to one more entries in the dataset of entries (104). For example, the target entry (102) may be a deposit in a bank statement that is to be matched to multiple checks received by a business, where the multiple checks are recorded as entries in the dataset of entries (104).

The dataset of entries (104), therefore, is a set of entries stored in a computer readable data structure. The dataset of entries (104) contain at least one entry, and possible multiple entries, that represent an exact match to the target entry (102). In the above example, the dataset of entries (104) are recorded entries of checks, of which one or more checks combined have a value equal to the deposit value of the target entry (102).

The dataset of entries (104) includes a data subset (106). The data subset (106) is a subset of the dataset of entries (104) that remains after executing the rule-based application (122) (defined below) according to the method of FIG. 2A. Thus, the sorting language model (124) and the matching language model (126) use fewer tokens to process the data subset (106) when matching to the target entry (102).

The dataset of entries (104) also includes a number of candidate matching sets (108). The candidate matching sets (108) are one entry in the data subset (106), or a combination of entries in the data subset (106), that are candidates for matching the target entry (102). The candidate matching sets (108) are generated by executing the sorting language model (124) on the data subset (106) and the target entry (102), as described with respect to FIG. 2A.

The dataset of entries (104) also include a selected matching set (110). The selected matching set (110) is one entry, or a combination of entries, in the dataset of entries (104) that matches the target entry (102). The selected matching set (110) is selected by the matching language model (126), as described with respect to FIG. 2A.

Figure 2A:
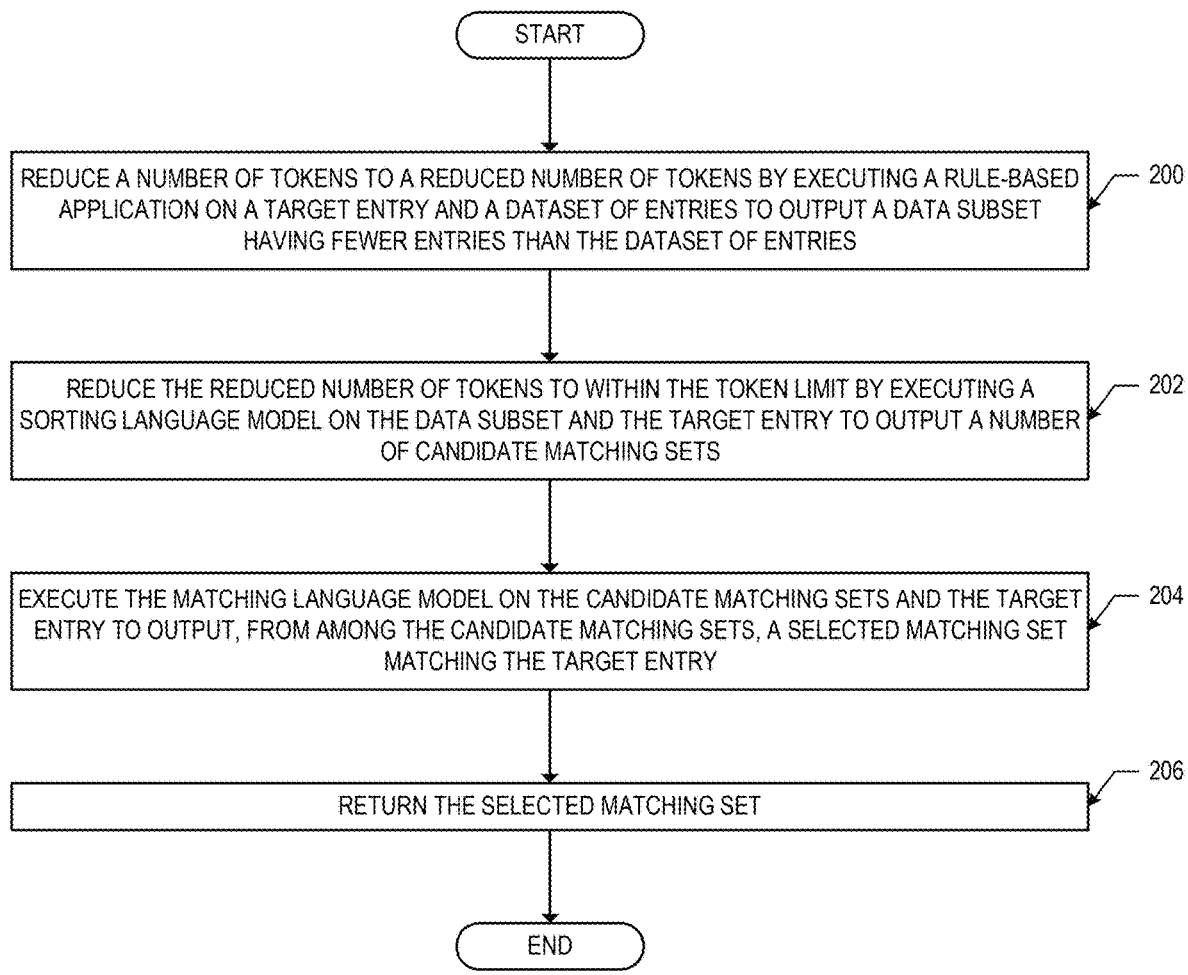
FIG. 2A shows a flowchart of a method for using a large language model ensemble for combinatorial retrieval in one-to-many matching tasks, in accordance with one or more embodiments.

The dataset of entries (104) also includes an incomplete matching set (112). The incomplete matching set (112) is one or more of the candidate matching sets (108), but which have a combined value that does not equal the value of the target entry (102). While the incomplete matching set (112) is not likely to be the selected matching set (110), one or more embodiments contemplate completing the incomplete matching set (112) and adding the completed matching sets to the candidate matching sets (108) prior to selecting the selected matching set (110). FIG. 2A describes the use of the incomplete matching set (112).

The data repository (100) also stores a token limit (114). The token limit (114) is the maximum number of tokens that the matching language model (126) (or the sorting language model (124)) can process when performing a task, including a matching task according to one or more embodiments.

The data repository (100) also stores a reduced number of tokens (116). The reduced number of tokens (116) is the number of tokens remaining after applying the rule-based application (122) to the dataset of entries (104) to generate the data subset (106). The number of tokens may be further reduced to within the token limit (114), or less, by using the sorting language model (124), as described with respect to FIG. 2A.

The system shown in FIG. 1 may include other components. For example, the system shown in FIG. 1 also may include a server (118). The server (118) is one or more computer processors, data repositories, communication devices, and supporting hardware and software. The server (118) may be in a distributed computing environment. The server (118) is configured to execute one or more applications, such as the rule-based application (122), the sorting language model (124), the matching language model (126), the server controller (128), and the training controller (130). An example of a computer system and network that may form the server (118) is described with respect to FIG. 5A and FIG. 5B.

The server (118) includes a computer processor (120). The computer processor (120) is one or more hardware or virtual processors which may execute computer readable program code that defines one or more applications, such as the rule-based application (122), the sorting language model (124), the matching language model (126), the server controller (128), and the training controller (130). An example of the computer processor (120) is described with respect to the computer processor(s) (502) of FIG. 5A.

The server (118) also includes a rule-based application (122). The rule-based application (122) is a computer program that, when executed, applies rules or policies to the dataset of entries (104) in order to exclude entries in the dataset of entries (104) as being possible candidate for matching to the target entry (102). For example, the target entry (102) has a date before entries in the dataset of entries (104). One of the rules in the rule-based application (122) is that the candidate matching sets (108) comes from entries in the dataset of entries (104) that predate the target entry (102). Thus, those entries in the dataset of entries (104) that do not predate the target entry (102) may be excluded from consideration as candidate matches, thereby reducing the token limit.

The server (118) also includes a number of language models, including sorting language model (124), and matching language model (126). The language models are a natural language processing machine learning model. An example of the language models may be a large language model, such as CHATGPT® by OpenAI. However, different language models may be used. Use of the language models is described with respect to FIG. 2A. Training of the sorting language model (124) or the matching language model (126) is described with respect to FIG. 2B.

The sorting language model (124) is a language model. The sorting language model (124) is distinguished from the matching language model (126) in that the sorting language model (124) is given a prompt to sort the data subset (106) into the candidate matching sets (108). Further detail regarding the function and operation of the sorting language model (124) is described with respect to FIG. 2A.

The matching language model (126) is distinguished from the sorting language model (124) in that the matching language model (126) is given a prompt to identify, from the candidate matching sets (108), the selected matching set (110). Further detail regarding the function and operation of the matching language model (126) is described with respect to FIG. 2A. The matching language model (126) may, or may not, be the same language model used to execute the function of the sorting language model (124).

The server (118) also may include a server controller (128). The server controller (128) is software or application specific hardware which, when executed by the computer processor (120), controls and coordinates operation of the software or application specific hardware described herein. The server (118) may execute the method of FIG. 2A or the method of FIG. 2B. The server controller (128) also may control and coordinate execution of the server (118), the sorting language model (124), and the matching language model (126).

The server (118) also may include a training controller (130). The training controller (130) is software or application specific hardware which, when executed by the computer processor (120), trains one or more machine learning models (e.g., the sorting language model (124) and the matching language model (126)). The training controller (130) is described in more detail with respect to FIG. 1B.

The training controller (130) may be programmed to train the sorting language model according to a group relative policy optimization (GRPO) reinforcement learning method. Specifically, a reward function of the GRPO reinforcement learning function may be proportional to a coverage of combinations in the candidate matching sets (108). By training the sorting language model (124) according to the GRPO reinforcement learning function, the sorting language model (124) is trained to reward groups in the data subset (106) that match, or potentially could match, the target entry (102). The coverage could also be represented in terms of dollar amounts (i.e., values of the datasets) or by the number of included candidate matching sets. Additional detail regarding the operation of the training controller (130) is described with respect to FIG. 2B.

The system shown in FIG. 1 also may include one or more user devices (132). The user devices (132) are computing systems (e.g., the computing system (500) shown in FIG. 5A) that communicate with the server (118).

The user devices (132) may be considered remote or local. A remote user device is a device operated by a third-party (e.g., an end user of a chatbot) that does not control or operate the system of FIG. 1. Similarly, the organization that controls the other elements of the system of FIG. 1 may not control or operate the remote user device. Thus, a remote user device may not be considered part of the system of FIG. 1.

In contrast, a local user device is a device operated under the control of the organization that controls the other components of the system of FIG. 1. Thus, a local user device may be considered part of the system of FIG. 1.

While FIG. 1 shows a configuration of components, other configurations may be used without departing from the scope of one or more embodiments. For example, various components may be combined to create a single component. As another example, the functionality performed by a single component may be performed by two or more components.

Figure 2B:
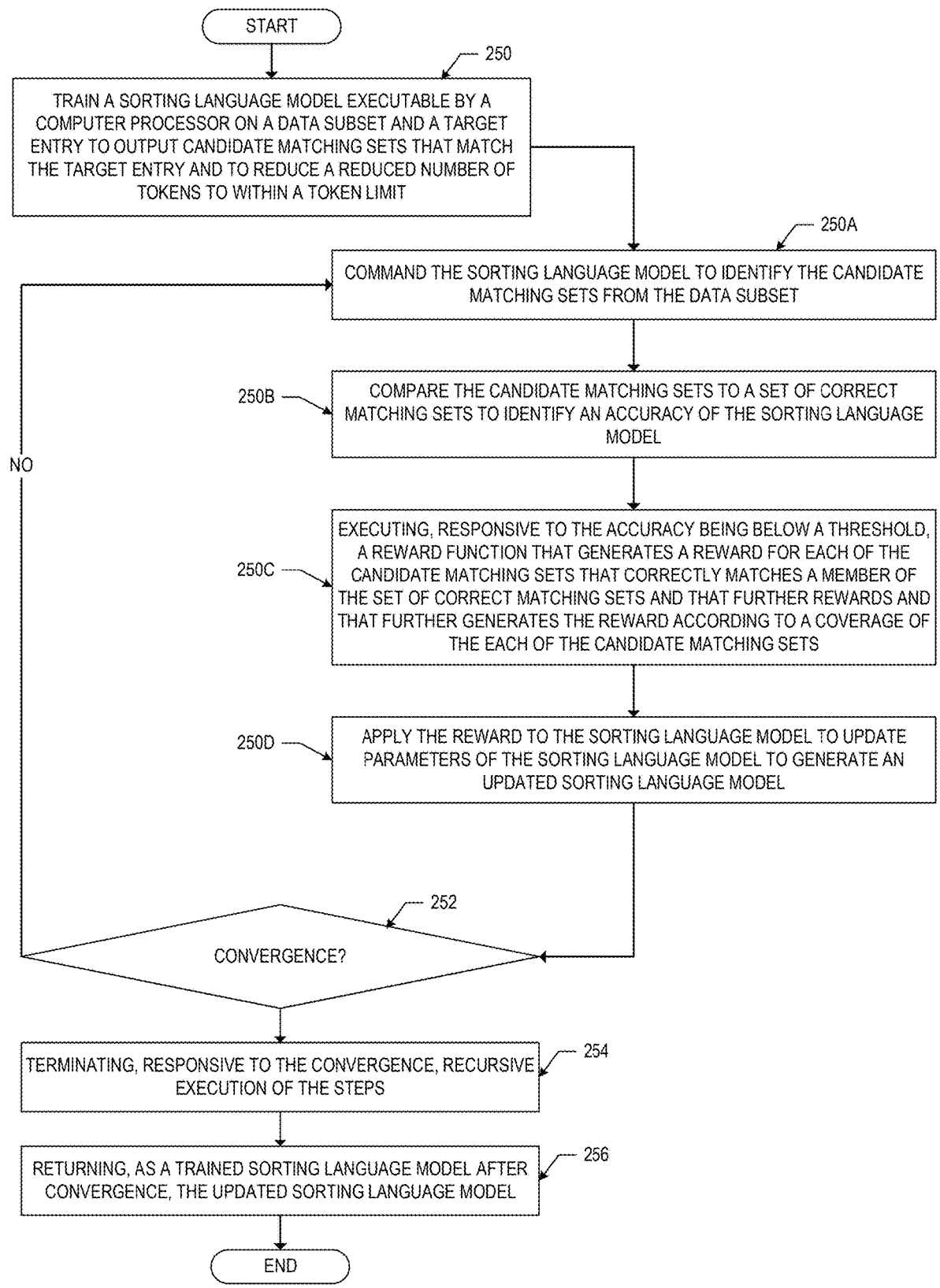
FIG. 2B shows a flowchart of a method for training a large language model ensemble for combinatorial retrieval in one-to-many matching tasks, in accordance with one or more embodiments.

FIG. 2A shows a flowchart of a method for using a large language model ensemble for combinatorial retrieval in one-to-many matching tasks, in accordance with one or more embodiments. FIG. 2B shows a flowchart of a method for training a large language model ensemble for combinatorial retrieval in one-to-many matching tasks, in accordance with one or more embodiments. The methods of FIG. 2A and FIG. 2B may be implemented using the system of FIG. 1 and one or more of the steps may be performed on or received at one or more computer processors.

Attention is first turned to the method of FIG. 2A. The method may be characterized as a method of executing a matching language model to perform a many-to-one matching task.

Step 200 includes reducing a number of tokens to a reduced number of tokens by executing a rule-based application on a target entry and a dataset of entries to output a data subset including fewer entries than the dataset of entries. The data subset and the target entry are selected from the dataset of entries. The many-to-one matching task uses a number of tokens that exceeds a token limit of the matching language model.

The rule-based application, when executed by a processor, applies one or more rules or policies to the dataset of entries for the purpose of eliminating entries in the dataset which, for whatever reason, cannot be a member of the candidate matching sets. For example, as mentioned above, the rule-based application may exclude entries based on a timestamp associated with the entries. Those entries outside of a range of the timestamp are excluded.

In another example, the dataset of entries may be associated with metadata tags that indicate the type of each entry. For example, some entries may relate to deposits, others to invoices, others to receipts, others to inventory records, etc. In an embodiment, the rule-based application selects only those entries that are pertinent to the match (e.g., paid invoices or other records indicating income when the matching task is to match multiple income records to a single deposit). Thus, many of the dataset of entries may be excluded by way of execution of the rule-based application. Still other rules may be applied.

More generally, each entry of the dataset of entries may include corresponding metadata. In this case, reducing the number of tokens may include excluding entries from the dataset of entries for which the corresponding metadata fails to match a rule in the rule-based application.

In any case, the number of the dataset of entries is reduced to a data subset. A language model processes fewer tokens on the data subset because the number of words or values has been reduced, in some cases greatly reduced.

Step 202 includes reducing the reduced number of tokens to within the token limit by executing a sorting language model on the data subset and the target entry to output a number of candidate matching sets. Reducing the reduced number of tokens may include instructing the sorting language model to identify combinations of entries in the data subset that are within a constraint defined by the target entry. The input to the sorting language model, therefore, is the data subset and the target entry, along with a prompt that includes the instructions mentioned immediately above. The output of the sorting language model is a series of groups of the data subset. Each group of the data subsets is one of the candidate matching sets.

The number of candidate matching sets may be further evaluated as to whether a potential match exists with the target entry. For example, those members of the candidate matching sets that cannot be a true match may be excluded by way of applying the rule-based application. For example, in the invoice matching example above, if one of the candidate matching sets is a combination of paid invoices that add up to more than the deposit that constitutes the target entry, then that candidate matching set is excluded. Other rules may be applied to identify, and eliminate, ones of the candidate matching sets that cannot be the selected matching set.

Step 202 may be further modified in order to further reduce the number of candidate matching sets, or to add potential candidate matching sets that could have been missed by the execution of the sorting language model. In other words, step 202 may be modified to further eliminate candidate matching sets that cannot be the selected matching set, or to add additional candidate matching sets that could be the selected matching set but were missed by the sorting language model for some reason.

For example, step 202 also may include identifying, from the matching candidate sets, an incomplete matching set. An incomplete matching set is a set that does not exactly match the target entry value. Continuing the above example, the total value of five invoices (one of the candidate matching sets) may be $200, but the value of the target entry is $250. Thus, the group of five invoices (i.e., one of the candidate matching sets) is an incomplete matching set.

Then, the server controller identifies, from the dataset of entries, an additional entry that at least partially completes the incomplete matching set. Continuing the example, the server controller identifies an additional invoice in the data subset (or in the dataset of entries) that has a value that, when added to the candidate matching set, adds up to the value of the deposit (i.e., the target entry).

The server controller then incorporates, prior to executing the matching language model, the additional entry into the incomplete matching set. Thus, the incomplete matching set either becomes a complete matching set, or a partial matching set that is closer to the value of the target entry. In an embodiment, multiple additional entries may be added to transform the incomplete candidate matching set to a complete candidate matching set.

In an embodiment, the server controller may identify the incomplete matching set, identify the additional entry, and incorporate the additional entry recursively until the incomplete matching set is a complete matching set. Thus, in an embodiment, all of the candidate matching sets are complete matching sets before passing the candidate matching sets to the matching language model.

In a similar, but different, embodiment, step 202 may include identifying, from the matching candidate sets, an incomplete matching set. Then, like the embodiment above, the server controller identifies, from the dataset of entries, a number of additional entries that at least partially completes the incomplete matching set. However, now the server controller duplicates the incomplete matching set into a number of duplicate incomplete matching sets.

Then, the server controller incorporates, prior to executing the matching language model, at least one different entry of the additional entries into each of the duplicate incomplete matching sets. As a result, the server controller generates multiple additional candidate matching sets. The multiple additional candidate matching sets are then added to the candidate matching sets. The embodiment described above thereby helps to ensure that potential candidate matching sets are not missed.

Note that the combined effect of step 200 and step 202 is to reduce the number of tokens to within the token limit of the matching language model, before performing step 204, below. The technical effect may be achieved by eliminating data entries that cannot match the target entry (i.e., step 200), and performing a preprocessing step that identifies potential candidate matches (i.e., step 202). As a result, the work that the matching language model performs to identify a one-to-many match (or some other match) may be greatly reduced. More particularly, not only is the number of tokens reduced to within the token limit of the matching language model, but also a reduction is achieved in the total number of execution steps that the matching language model performs to identify the selected matching set.

Thus, one or more embodiments permit the matching language model to perform a matching computing task that, prior to one or more embodiments, could not have been performed. Additionally, whether or not the initial number of the dataset of entries exceeded the token limit of the matching language model, one or more embodiments also increase the execution speed of performing the matching computing task. Thus, in either case, one or more embodiments may achieve the desired technical effect.

Step 204 includes executing the matching language model on the number of candidate matching sets and the target entry to output, from among the number of candidate matching sets, a selected matching set matching the target entry. The input to the matching language model is candidate matching sets, the target entry, and a prompt that instructs the matching language model to identify a selected matching set as being the best match to the target entry. The output of the matching language model is the selected matching set.

In an embodiment, the candidate matching sets include only complete matching datasets (e.g., in the variation of step 202, above). In this case, executing the matching language model may further include instructing the matching language model to identify the selected matching set from among the complete matching datasets according to a policy described in a prompt used to execute the matching language model. The policy, for example, may be that all of the members of a complete matching set should be within a pre-defined time range. Other policies may be used.

Step 206 includes returning the selected matching set. Returning the selected matching set may include storing the selected matching set. Returning the selected matching set may include passing the selected matching set to a computer service, such as another program that will process the selected matching set for another desired purpose. Returning the selected matching set may include displaying the selected matching set to a user. Returning the selected matching set may include performing other computer actions with the selected matching set.

Attention is now turned to FIG. 2B. FIG. 2B is a method of training the sorting language model in FIG. 1. FIG. 2B also may be used to train the matching language model in FIG. 1, substituting the term "matching" for "sorting."

Step 250 includes training a sorting language model executable by a computer processor on a data subset and a target entry to output a number of candidate matching sets that match the target entry and to reduce a reduced number of tokens to within a token limit. The steps of training are described with respect to step 250A through step 250D, below. The steps are performed recursively until convergence.

Step 250A includes commanding the sorting language model to identify the number of candidate matching sets from the data subset. The sorting language model then returns the number of candidate matching sets.

Step 250B includes comparing the number of candidate matching sets to a set of correct matching sets to identify an accuracy of the sorting language model. The accuracy of the model may be expressed as a percentage of correct answers. For example, known correct matching sets may already exist, permitting the training controller to compare the correct matching sets to the candidate matching sets identified at step 250A. In this manner, the accuracy of the sorting language model may be evaluated.

Step 250C includes executing, responsive to the accuracy being below a threshold, a reward function that generates a reward for each of the number of candidate matching sets that correctly matches a member of the set of correct matching sets and that further rewards and that further generates the reward according to a coverage of the each of the number of candidate matching sets. In other words, the reward function rewards the sorting language model for each correctly identified candidate matching set that matches a known correct matching dataset. The reward takes the form of a value or values that are used to adjust the parameters of the sorting language model. The coverage reward relates to an overall reward for identifying a higher percentage of correct candidate matching sets. Thus, the sorting language model may be doubly rewarded for correctly identifying candidate matching sets.

Step 250D includes applying the reward to the sorting language model to update parameters of the sorting language model to generate an updated sorting language model. As mentioned above, the reward is used to change the parameters of the sorting language model. The parameters are numbers that define the relationships in the nodes of the neural network that constitutes the sorting language model. Thus, the reward modifies the parameters and thereby modifies the relationships among the nodes in the neural network. Thus, the sorting language model "learns" (i.e., is more capable of identifying correct candidate datasets).

Step 252 includes determining whether convergence occurs. Convergence occurs when the accuracy satisfies the threshold. If convergence does not occur (a "no" determination at step 252), then the step of executing repeats (i.e., step 250A through step 250D repeats).

Step 254 includes terminating, responsive to the convergence, recursive execution of the steps. Thus, recursive execution of step 250A through Step 250D terminates.

Step 256 includes returning, as a trained sorting language model after convergence, the updated sorting language model. Returning may include storing the trained sorting language model. Returning may include hosting the trained sorting language model in an enterprise system for execution (i.e., is made available to perform the method of FIG. 2A). Other forms of returning the trained sorting language model are contemplated.

While the various steps in the flowcharts of FIG. 2A and FIG. 2B are presented and described sequentially, at least some of the steps may be executed in different orders, may be combined or omitted, and at least some of the steps may be executed in parallel. Furthermore, the steps may be performed actively or passively.

Figures 3, 4:
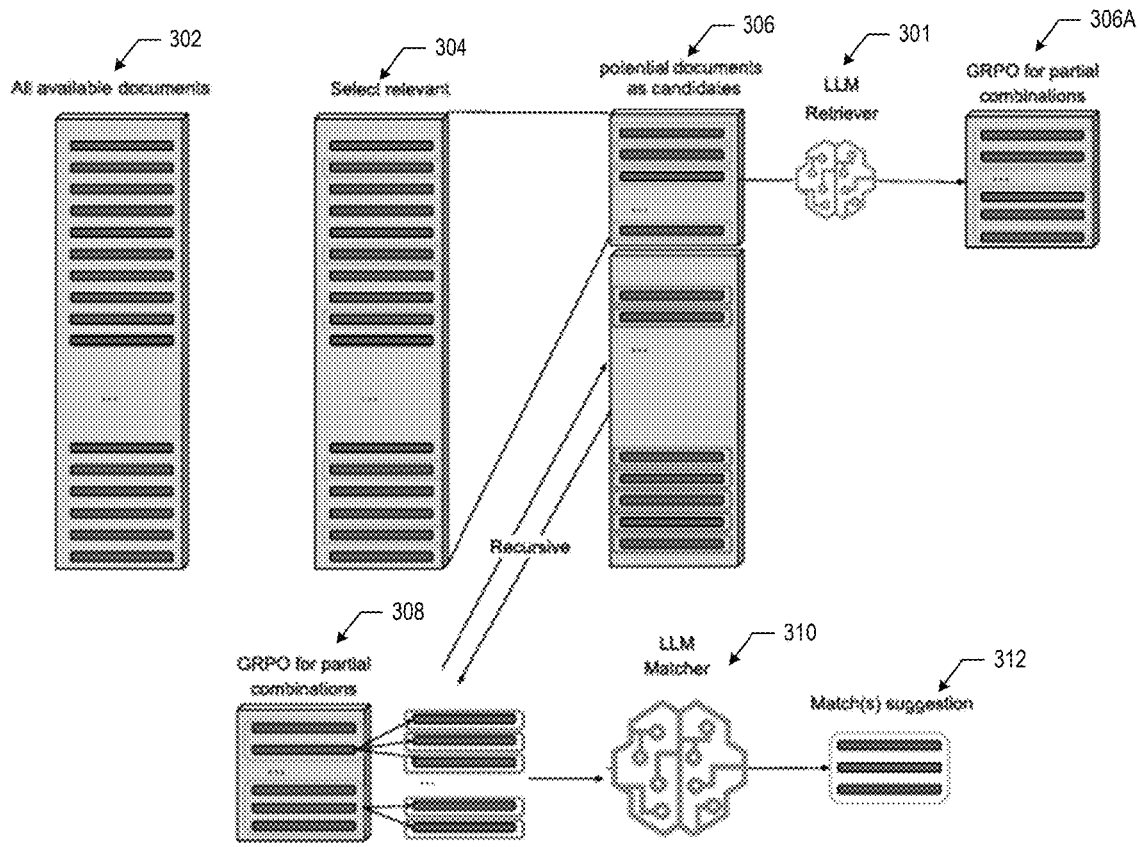
FIG. 3 shows an example of a method for large language model ensemble for combinatorial retrieval in one-to-many matching tasks, in accordance with one or more embodiments.
FIG. 4 shows an example of matching, in accordance with one or more embodiments.

FIG. 3 shows an example of a method for large language model ensemble for combinatorial retrieval in one-to-many matching tasks, in accordance with one or more embodiments. FIG. 4 shows an example of matching, in accordance with one or more embodiments. The examples of FIG. 3 and FIG. 4 exemplify the system of FIG. 1 and the method of FIG. 2A, and thus should not be deemed to limit other embodiments described herein.

In FIG. 3, available documents (302) represent the dataset of entries. The documents related to business records for a business, such as invoices, receipts, income, expenses, etc. The available documents (302) are stored in an enterprise system that also hosts a financial management application. The financial management application has been tasked with reconciling a single large deposit (i.e., the bank transaction (300)) to a series of invoices paid by customers to the business.

Thus, the financial management application is tasked to perform a many-to-one matching computer function, which is to match a subset of the available documents (302) which, taken together, add up to the $250 bank transaction (300). The many-to-one matching computer function exceeds the token limit of a large language model (LLM) retriever (i.e., LLM retriever (301)). Given the volume of data, and the efficiency of the LLM retriever (301), it is desirable to use the LLM retriever (301) to perform the many-to-one matching computer function.

Thus, at the select relevant documents step (304), a rule-based application is applied to select the relevant documents from the available documents (302). As a result, the number of tokens used by the LLM retriever (301) is reduced. The reduction proceeds according to step 200 of FIG. 2.

Next, at the select candidate matches step (306), candidate matching sets are identified from among the relevant documents identified at the select relevant documents step (304). The matching is performed according to step 202 of FIG. 2. In the example of FIG. 3, complete matching sets are identified.

The select candidate matches step (306) also identifies incomplete matching sets. However, at the generate partial combinations sub-step (306A), additional datasets from the select relevant documents step (304) or from the available documents (302) are added to the partial matching steps to generate additional complete matching sets. The generation of additional complete matching sets is also described with respect to FIG. 3A.

After the select candidate matches step (306) and the generate partial combinations sub-step (306A), a set of final candidate matches (308) is generated. Because the number of datasets has been reduced, and further because a number of candidate matches have already been identified, the many-to-one matching problem no longer exceeds the token limit of the LLM matching step (310).

Thus, the final candidate matches (308) and the bank transaction (300) are provided together as input to the LLM matching step (310), along with a prompt that commands the matching language model to identify, from among the final candidate matches (308), the selected matching set (312). The matching language model outputs the selected matching set (312), which is then returned to the financial management application. In turn, the financial management application may now properly and automatically reconcile the income receipts with the bank deposit, without any input from a user. Accordingly, the capabilities and efficiency of the computing system that hosts the financial management application and the matching system are improved.

FIG. 4 shows a practical example of one or more embodiments. A bank transaction has the following characteristics: Amount: $250, Date: 2025 Mar. 1, Description: "Transfer from John Doe." FIG. 4 shows receipts (400), the corresponding values (402) of the receipts (400), the dates (404) of the receipts (400), and the customer name (406) from whom the receipts (400) were received. The receipts (400) are sorted using a rule-based application. The rule-based application sorts the receipts (400) based on precision of the match of customer names to the description in the bank transaction, and proximity of dates to the bank transaction. The rule-based application corresponds to step 200 of FIG. 2.

From the resulting reduced pool of receipts, step 202 of FIG. 2 is performed. The server controller identifies that receipts "1" and "3" form an incomplete matching set. However, the incomplete matching set is completed by noting that another relevant candidate, receipt "X" has an amount of $50 and a date of 2025 Feb. 28 and a customer name of John Doe. Thus, receipt "X" is added to the incomplete matching set to generate a complete matching set.

Finally, at step 204 of FIG. 2, the matching language model would logically recommend that matching set [1, 3, X] perfectly match the bank transaction in the query. Note, as indicated by the multiple ellipsis shown in the table of FIG. 4, many other receipts are present. Thus, in practice, the matching language model would select from many other complete matching sets (e.g., receipt "N" and some other $25 receipt not shown in the table). However, the matching language model is able to distinguish between the complete matching sets to select the selected matching set based on the other information present (i.e., dates, customer names, and possibly other information not shown).

In any case, the process identifying the selected matching set described above reduces the number of tokens used to perform the many-to-one matching problem to less than the token limit of the matching language model. Thus, one or more embodiments improve the capabilities of the computing system and further increases the computational speed of the computing system when performing the many-to-one matching problem.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
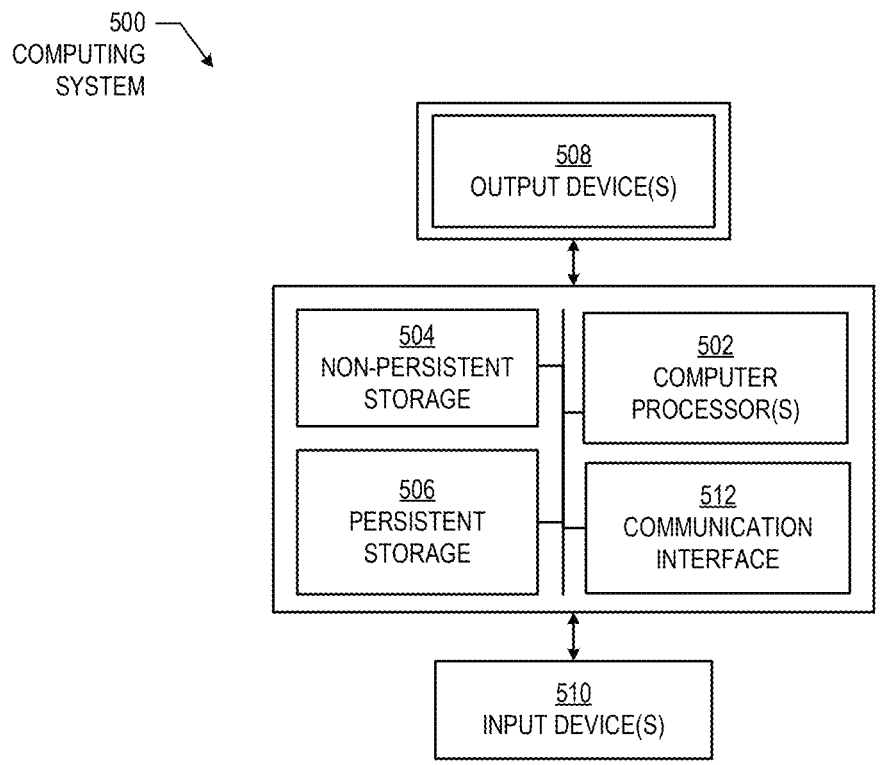
FIG. 5A and FIG. 5B show a computing system and network environment, in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
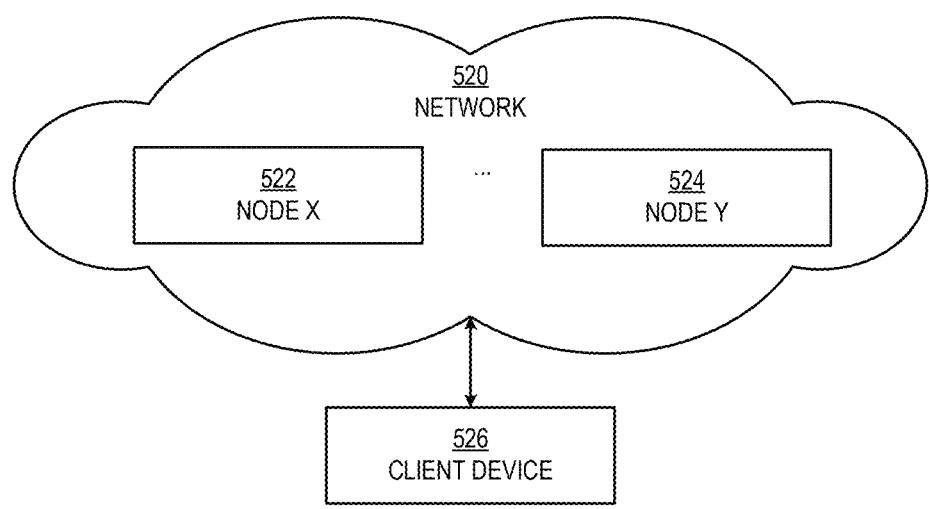

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method of executing a matching language model to perform a many-to-one matching task, the method comprising:
    reducing a number of tokens to a reduced number of tokens by executing a rule-based application on a target entry and a dataset of entries to output a data subset comprising fewer entries than the dataset of entries, wherein:
        the data subset and the target entry are selected from the dataset of entries, and
        the many-to-one matching task uses a number of tokens that exceeds a token limit of the matching language model;
    reducing the reduced number of tokens to within the token limit by executing a sorting language model on the data subset and the target entry to output a plurality of candidate matching sets, wherein the plurality of candidate matching sets are evaluated as to whether a potential match exists with the target entry;
    executing the matching language model on the plurality of candidate matching sets and the target entry to output, from among the plurality of candidate matching sets, a selected matching set matching the target entry; and
    returning the selected matching set.

2. The method of claim 1, further comprising:
    identifying, from the plurality of candidate matching sets, an incomplete matching set;
    identifying, from the dataset of entries, an additional entry that at least partially completes the incomplete matching set; and
    incorporating, prior to executing the matching language model, the additional entry into the incomplete matching set.

3. The method of claim 2, further comprising:
    identifying the incomplete matching set, identifying the additional entry, and incorporating the additional entry recursively until the incomplete matching set comprises a complete matching set.

4. The method of claim 1, further comprising:
    identifying, from the plurality of candidate matching sets, an incomplete matching set;
    identifying, from the dataset of entries, a plurality of additional entries that at least partially completes the incomplete matching set;
    duplicating the incomplete matching set into a plurality of duplicate incomplete matching sets;
    incorporating, prior to executing the matching language model, at least one different entry of the plurality of additional entries into each of the plurality of duplicate incomplete matching sets to generate a plurality of additional candidate matching sets; and
    adding the plurality of additional candidate matching sets to the plurality of candidate matching sets.

5. The method of claim 1 wherein the sorting language model is trained according to a group relative policy optimization (GRPO) reinforcement learning method.

6. The method of claim 5, wherein a reward function of the GRPO reinforcement learning method is proportional to a coverage of combinations in the plurality of candidate matching sets.

7. The method of claim 1,
    wherein each entry of the dataset of entries comprises corresponding metadata, and
    wherein the reducing the number of tokens comprises excluding entries from the dataset of entries for which the corresponding metadata fails to match a rule in the rule-based application.

8. The method of claim 1, wherein reducing the reduced number of tokens comprises instructing the sorting language model to identify combinations of entries in the data subset that are within a constraint defined by the target entry.

9. The method of claim 1, wherein the plurality of candidate matching sets comprise only complete matching datasets.

10. The method of claim 9, wherein executing the matching language model comprises instructing the matching language model to identify the selected matching set from among the complete matching datasets according to a policy described in a prompt used to execute the matching language model.

11. The method of claim 1, wherein returning the selected matching set comprises passing the selected matching set to a computer service.

12. A system comprising:
    a computer processor;
    a data repository in communication with the computer processor and storing:
        a target entry,
        a token limit,
        a dataset of entries which include a data subset comprising fewer entries than the dataset of entries, a plurality of candidate matching sets, a plurality of matching entries, and a selected matching set that matches the target entry,
            wherein performing a many-to-one matching task on the target entry and the dataset of entries uses a number of tokens exceeding the token limit, and
        a reduced number of tokens relative to the number of tokens used to perform the many-to-one matching task, but higher than the token limit,
    a rule-based application executable by the computer processor on the target entry and the dataset of entries to output the data subset corresponding to the reduced number of tokens;
    a sorting language model, having the token limit, executable by the computer processor on the data subset and the target entry to output the plurality of candidate matching sets and to reduce the reduced number of tokens to within the token limit; and
    a matching language model executable by the computer processor on the plurality of candidate matching sets and the target entry to output, from among the plurality of candidate matching sets, the selected matching set.

13. The system of claim 12, further comprising a server controller which, when executed by the computer processor:
    identifies, from the plurality of candidate matching sets, an incomplete matching set;

identifies, from the dataset of entries, an additional entry that at least partially completes the incomplete matching set; and incorporates, prior to executing the matching language model, the additional entry into the incomplete matching set.

14. The system of claim 13, wherein the server controller is further programmed to:

identify the incomplete matching set, identifying the additional entry, and incorporating the additional entry recursively until the incomplete matching set comprises a complete matching set.

15. The system of claim 12, further comprising a server controller programmed to:

identify, from the plurality of candidate matching sets, an incomplete matching set;

identify, from the dataset of entries, a plurality of additional entries that at least partially completes the incomplete matching set;

duplicate the incomplete matching set into a plurality of duplicate incomplete matching stets;

incorporate, prior to executing the matching language model, at least one different entry of the plurality of additional entries into each of the plurality of duplicate incomplete matching sets to generate a plurality of additional candidate matching sets; and add the plurality of additional candidate matching sets to the plurality of candidate matching sets.

16. The system of claim 12 further comprising:

a training controller programmed to train the sorting language model according to a group relative policy optimization (GRPO) reinforcement learning method.

17. The system of claim 16, wherein a reward function of the GRPO reinforcement learning method is proportional to a coverage of combinations in the plurality of candidate matching sets.

18. The system of claim 12, wherein each entry of the dataset of entries comprises corresponding metadata, and wherein reducing the number of tokens comprises excluding entries from the dataset of entries for which the corresponding metadata fails to match a rule in the rule-based application.

19. The system of claim 12, wherein reducing the reduced number of tokens comprises instructing the sorting language model to identify any combination of entries in the data subset that are within a constraint defined by the target entry.

20. A method, comprising:

training a sorting language model executable by a computer processor on a data subset and a target entry to output a plurality of candidate matching sets that match the target entry and to reduce a reduced number of tokens to within a token limit;

executing, recursively, steps comprising:

commanding the sorting language model to identify the plurality of candidate matching sets from the data subset, comparing the plurality of candidate matching sets to a set of correct matching sets to identify an accuracy of the sorting language model, executing, responsive to the accuracy being below a threshold, a reward function that generates a reward for each of the plurality of candidate matching sets that correctly matches a member of the set of correct matching sets and that further rewards and that further generates the reward according to a coverage of the each of the plurality of candidate matching sets, and applying the reward to the sorting language model to update parameters of the sorting language model to generate an updated sorting language model;

determining whether convergence occurs, wherein the convergence occurs when the accuracy satisfies the threshold, and wherein if the convergence does not occur, then the steps of executing recursively repeats;

terminating, responsive to the convergence, recursive execution of the steps; and returning, as a trained sorting language model after the convergence, the updated sorting language model.

\* \* \* \* \*